United States Patent [19]

Torok

[11] 4,313,751
[45] Feb. 2, 1982

[54] MOLD WITH EXTERIOR HEAT CONDUCTING ELEMENTS

[76] Inventor: Julius J. Torok, 3411 Kingsgate Blvd., Toledo, Ohio 43606

[21] Appl. No.: 235,923

[22] Filed: Feb. 19, 1981

[51] Int. Cl.³ .......................... C03B 9/38; C03B 11/12
[52] U.S. Cl. ....................................... 65/267; 65/319; 65/355
[58] Field of Search ................. 65/265, 267, 319, 355, 65/356; 249/111

[56] References Cited

U.S. PATENT DOCUMENTS

| | | | |
|---|---|---|---|
| 2,901,865 | 9/1959 | McCormick | 49/40 |
| 2,988,851 | 6/1961 | Holscher | 49/40 |
| 3,224,860 | 12/1965 | Stinnes | 65/335 |
| 3,644,110 | 2/1972 | Sendt | 65/265 X |
| 3,844,753 | 10/1974 | Huebner | 65/17 |
| 3,849,101 | 11/1974 | Wythe et al. | 65/355 |
| 4,140,512 | 2/1979 | Carmi et al. | 65/319 |
| 4,142,884 | 3/1979 | Jones, Jr. | 65/356 |

FOREIGN PATENT DOCUMENTS 2377261 9/1978 France .................................. 65/355

*Primary Examiner*—Arthur D. Kellogg
*Attorney, Agent, or Firm*—John C. Purdue

[57] ABSTRACT

An improvement in a mold, for example one used for forming glass or plastic articles, is disclosed. Such a mold has a heat dissipating surface and a forming surface in heat transfer communication with the heat dissipating surface. The improvement involves a conduit and a plurality of heat conducting elements, each of which is in heat transfer communication with the conduit and with a portion of the heat dissipating surface. Each of the heat conducting elements is of such size, shape and material, and is so situated with respect to heat transfer from the heat dissipating surface that, when the mold is in service and a heat tranfer fluid is circulated through the conduit, heat transfer from the heat dissipating surface, through the heat conducting elements and to the conduit maintains each segment of the forming surface at a predetermined temperature. This improvement is also provided in a mold which has two parts, one of which includes the heat dissipating surface and the other of which includes the forming surface, and wherein the two parts have a heat conducting interface through which heat is transferred from the forming surface to the heat dissipating surface.

14 Claims, 2 Drawing Figures

MOLD WITH EXTERIOR HEAT CONDUCTING ELEMENTS

BACKGROUND OF THE INVENTION

1. Field of the Invention

This invention relates to molds for forming objects, especially glass or plastic articles, and more particularly relates to improved means for controlling heat extraction from forming surfaces of such molds.

2. Description of the Prior Art

At present many molds, for example, those used to produce pressed or blown glass or plastic articles, are air, steam or fluid cooled. Air cooling, usually by compressed or fan air, is relatively expensive, and often is capable of removing, frequently with improper distribution, only limited amounts of heat from hot surfaces of a mold for a given volume of air. Steam is also a comparatively inefficient coolant, largely because of its high initial temperature. Heretofore known methods of fluid cooling, although often more satisfactory than air or steam cooling in terms of cost and efficiency, can also be undesirable where heat flow rates are low because normal application extracts too much heat. When excessive cooling occurs because of excessive heat transfer from segments of a forming surface of a mold, their temperature can be lowered to a point where, for example, the glass or plastic article being formed cracks or is otherwise damaged. In this regard, air cooling is known to be generally more controllable at lower heat flow levels than fluid cooling; the supply thereof, for example, usually can be shut off, increased or decreased more easily and the air expelled as desired from a cooling system. However, air cooling systems ordinarily consume considerable electrical power and can also produce high noise levels, known to be detrimental to workers and their efficiency.

Numerous techniques have been suggested and used for fluid cooling of molds, including mist-type, and continuous and intermittent water flow systems. For example, U.S. Pat. No. 4,140,512 discloses a closed, water cooling system within a mold body. The system is said to be capable of pressurization to a desired extent, thereby to control the amount of heat removed from forming surfaces of a mold which contact glass being pressed. The apparatus described by this patent, like many others commonly used for the fluid cooling of molds, places fluid-contacting surfaces of the mold immediately opposite the surfaces in contact with the hot material being formed, so that heat transfer occurs directly through the mold wall and into the fluid. The fluid-contacting surfaces, in many cases maintained at the same temperature as the fluid itself, can therefore be 212 degrees F. or greater, depending on the boiling point of the particular fluid used and its pressure.* Since commonly-used mold wall materials are generally good heat conductors, and because of the limited amount of heat generated in a typical mold used for forming glass or plastics, the temperature of the interior of a mold wall seldom will be more than 70 degrees F. higher than that of the fluid-contacting surfaces of the same mold. Thus, the temperatures of segments of the hot forming surfaces of the mold are often of the order of 280 degrees F. when a water cooling system is tried. Ideally, the forming surfaces of certain segments of glass molds, in order to produce a quality glass article, should be within the range of 650–1000 degrees F. for most generally-used types of glass. One method of achieving such temperatures would be to increase the thickness of the mold wall to an extent which would provide the required heat transfer therethrough; its thickness would usually have to be increased, for most molds and glasses, by a factor of at least 10. In most cases it would be necessary also to vary the mold wall thickness from portion to portion thereof to enable differing amounts of heat transfer from various segments of the forming surface requiring different optimum temperatures; almost certainly, such a mold would be prohibitively costly to manufacture, heavy and difficult for workers to handle in service and may not be accommodated on many forming machines.

*If it were desired to use liquid water at 700 degrees F., a pressure of at least 3094 psi. would be required; mercury has been found to be well suited for use in cooling plungers of glass-forming apparatus.

SUMMARY OF THE INVENTION

The instant invention is based upon the discovery of an improvement in a mold having a heat dissipating surface and a forming surface in heat transfer communication with the heat dissipating surface. Such molds are used for press-forming and blow-molding glass and plastic articles. The improvement includes a conduit through which a heat transfer fluid is circulated when the mold is in service and a plurality of heat conducting elements, each of which is in heat transfer communication with the conduit and with a portion of the heat dissipating surface of the mold. The elements are formed of such a material, are of such size and shape, and are so situated with respect to heat transfer that, when the mold is in service and the heat transfer fluid is circulated through the conduit, heat transfer from the heat dissipating surface, through the heat conducting elements and to the conduit maintains each segment of the forming surface at a predetermined temperature.

The present invention also provides this improvement in a mold having two or more parts, one of which includes the heat dissipating surface and the other of which includes the forming surface, and wherein the two parts have a heat conducting interface. Heat transfer in such a mold according to the invention is from the forming surface, through the interface to the heat dissipating surface. Preferably, there is a material of high thermal conductivity between the surfaces of the mold parts at their interface. Examples of suitable materials of high thermal conductivity are some liquids, malleable sheets such as annealed aluminum and other metal foils, and oxidation-resistant powders, for example of graphite, stainless steel, nickel and chromium, or of Mo, W, Ag and Au.

The heat conducting elements through which, according to the invention, there is heat transfer from a portion of the heat dissipating surface to the conduit, are preferably held in heat transfer communication with that portion and with the conduit by a material having a high, stable thermal conductivity. For example, in a preferred embodiment, the elements are held by a brazed joint of a nonferrous filler metal such as an aluminum bronze. Materials such as copper, zinc, iron, steel, stainless steel and mixtures thereof can also be used. The heat conducting elements, in another preferred embodiment, can be urged with high pressure in releasable engagement with both the heat dissipating surface and the conduit by such means as screws, wedges or straps composed of a material which has a coefficient of thermal expansion substantially the same as that of the mold material. The elements themselves are preferably composed of or coated with a material which has high oxidation and corrosion resistance.

Accordingly, it is an object of this invention to provide an improvement in a mold.

It is a further object of this invention to provide an improvement in a two-part mold, one part having a forming surface and the other part having a heat-dissipating surface, which improvement includes means through which there is heat transfer between the two mold parts and to a conduit containing a heat transfer fluid, so that each segment of the forming surface is maintained at a predetermined temperature.

Other objects and advantages of the invention will be apparent from the description which follows, reference being made to the accompanying drawings.

DETAILED DESCRIPTION OF THE INVENTION

Figure 1:
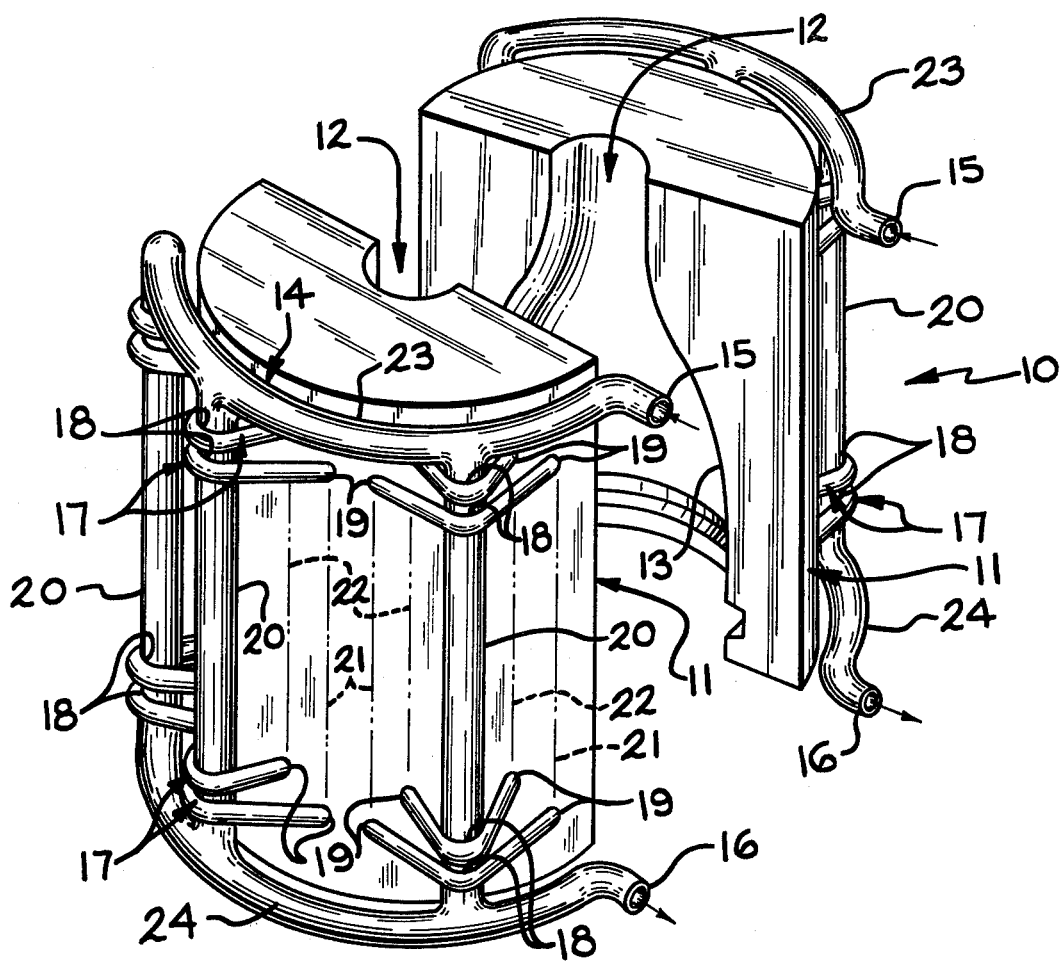
FIG. 1 is a partially-schematic perspective view illustrating one embodiment of the improvement of the instant invention, and showing two halves of an open and shut mold which can be used for blow-molding a glass article.

Referring now in more detail to FIG. 1, a blow mold for forming a blown glass article is indicated generally at 10. The mold 10 has a heat dissipating surface 11 which, in a particular case, may have an area of 0.76 square foot, and an interior mold cavity 12 bounded by a forming surface 13 which, in the particular case, may have an area of 0.475 square foot. A conduit circuit 14 having inlets 15 and outlets 16 surrounds the mold 10. Copper heat conducting elements 17 are brazed at 18 and 19 to a vertical leg 20 of the conduit 14 and to the heat dissipating surface 11, respectively. As is indicated by broken lines 21 and 22 the heat conducting elements 17 extend, spaced from one-another, from top to bottom of the mold 10. Each of the heat conducting elements 17 is in heat transfer communication through its brazed connection 19 with a portion of the heat dissipating surface 11 and through its brazed connection 18 with one of the vertical legs 20.

In service, a cooling fluid is circulated through the conduit circuit 14 while parisons are blow molded, one after another, in the mold 10. Each parison is positioned generally within the mold cavity 12 by a blow pipe (not illustrated); a mold bottom (not illustrated) is moved into position; the two halves of the mold 10 are moved from the position shown in FIG. 1 to a closed position; the glass article is blown; and, after the glass article cools sufficiently, the mold 10 is opened, the article is removed, and the cycle is repeated. The cooling fluid flows into the inlets 15 from a source (not illustrated) through a supply header 23, through the vertical legs 20, a return header 24 and the outlets 16 to a holding tank (not illustrated) or the like. Heat is transferred from the hot parison to the forming surface 13, through the walls of the mold 10 to the heat dissipating surface 11, through the brazes 19, the heat conducting elements 17, the brazes 18 and the vertical legs 20 to the cooling fluid circulated therethrough.

In a typical operation, 9 bottles per minute, each weighing 10 ounces, may be made in the mold 10; the parison may enter the mold 10 at a temperature (on the average) of 1700 degrees F., and the bottle may leave the mold 10 at a temperature of 1400 degrees F. after having been shaped by contact with the forming surface 13 at a temperature of 1000 degrees F. In this case, since the relevent specific heat of glass is 0.28 Btu per pound per degree F., assuming that 20 percent of the heat goes into the bottom plate, $10/16 \times 0.28 \times 300 \times 9 \times 60 \times 0.80$ or 22,680 Btu per hour must be removed from the mold 10. This requires a heat flow adjacent the forming surface 13 of 22,680/0.475 or 47,747 Btu per hour per square foot and a heat flow adjacent the heat dissipating surface 11 of 22,680/0.76 or 29,842 Btu per hour per square foot. The average heat flow, then, is (29,842+47,747)/2 or 38,794 Btu per hour per square foot.

Temperature drops in the mold 10 can be calculated from the equation $$q = kA \text{ delta } t/L$$

where:

q is heat flow in Btu per hour
k is the thermal conductivity of the conductor
A is the area in square feet of the conductor
delta t is the temperature difference in degrees F. across the conductor
L is the length of the conductor in inches.

Assuming a cast iron mold (k=310) having a mean effective wall thickness of 1 inch, the temperature drop through the mold 10 is $(38,794 \times 1)/(310 \times 1)$ or 125 degrees F. Therefore, the temperature of the heat dissipating surface 11 is 1000−125 or 875 degrees F. Assuming that the vertical legs 20 are maintained, by circulation of the cooling fluid therethrough, at a temperature of 140 degrees F., the temperature drop from end to end of the heat conducting elements 17 is 875−140 or 735 degrees F. Consequently, the foregoing equation gives the following relationships* when the heat conducting elements are different materials each ½ inch in length:
(copper, k=2530)
  29842=((2530)(735) A)/(½)=(2530) (735) (2) A
  A=0.00802 square inch
(iron, k=375)
  29842=(375) (735) (2)×A
  A=0.0541 square inch
(stainless steel, SAE309, k=118)
  29842=(118) (735) (2) A
  A=0.1720 square inch

*per square foot of the heat dissipating surface 11, assuming one heat conducting element 17 for each square inch of the heat dissipating surface 11.

It will be appreciated that the foregoing illustrative calculations do not give cross-sectional areas for the heat conducting elements 17 which will necessarily provide a uniform temperature for the forming surface 13. For example, variations in the thickness of the wall of the mold 10 can cause some portions of the forming surface 13 to be at a temperature above 1000 degrees F. and others to be at a temperature below 1000 degrees F.; similarly, heat losses from the mold under actual operating conditions may also cause portions of the forming surface 13 to be at a temperature either above or below 1000 degrees F. While it would be possible to take variations in the thickness of the mold wall into account and to make a more accurate calculation of the particular combination of length and cross-sectional area required for each of the heat conducting elements 17 in order to achieve the desired uniform temperature for the forming surface 13, such a procedure is usually not warranted because, for optimum heat transfer, further refinement would still be required to compensate for heat transfer variations attributable to the environment in which the mold 10 operates. Accordingly, it is usually preferred that calculations of the type illustrated above be made, to determine an approximate combination of length and cross-sectional area for the heat conducting elements 17, and then the mold 10 actually fabricated. It is subsequently possible experimentally to operate the mold 10 and to determine the actual temperature at which various segments of the forming surface 13 reach equilibrium under operating conditions. Ordinarily, it will then be desirable to adjust the length or the cross-sectional area of the ones of the heat conducting elements 17 which influence, primarily, the segments of the forming surface 13 which are at a temperature too high or too low. The adjustments can be made on a "cut and try" basis, or on the basis of further calculations similar to those presented above. If necessary, second and even third modifications of the heat conducting elements 17 can be made to achieve the desired temperature uniformity on the forming surface 13. The rejection rate of articles produced from the mold 10 can be reduced significantly by eliminating variations in the temperature of the forming surface 13 and the speed at which the mold 10 is operated can be increased when this surface is at an optimum temperature, by comparison with the product quality and maximum speed achievable when the forming surface 13 is at a different temperature.

It will be appreciated that, once the lengths and the cross-sectional areas of the heat conducting elements 17 have been adjusted so that the temperature of the forming surface 13 is substantially uniform, the actual temperature at which the surface 13 operates can be controlled within limits by varying the temperature and the rate at which water is introduced through the inlets 15 into the conduit circuit 14 for flow through the vertical legs 20.

Figure 2:
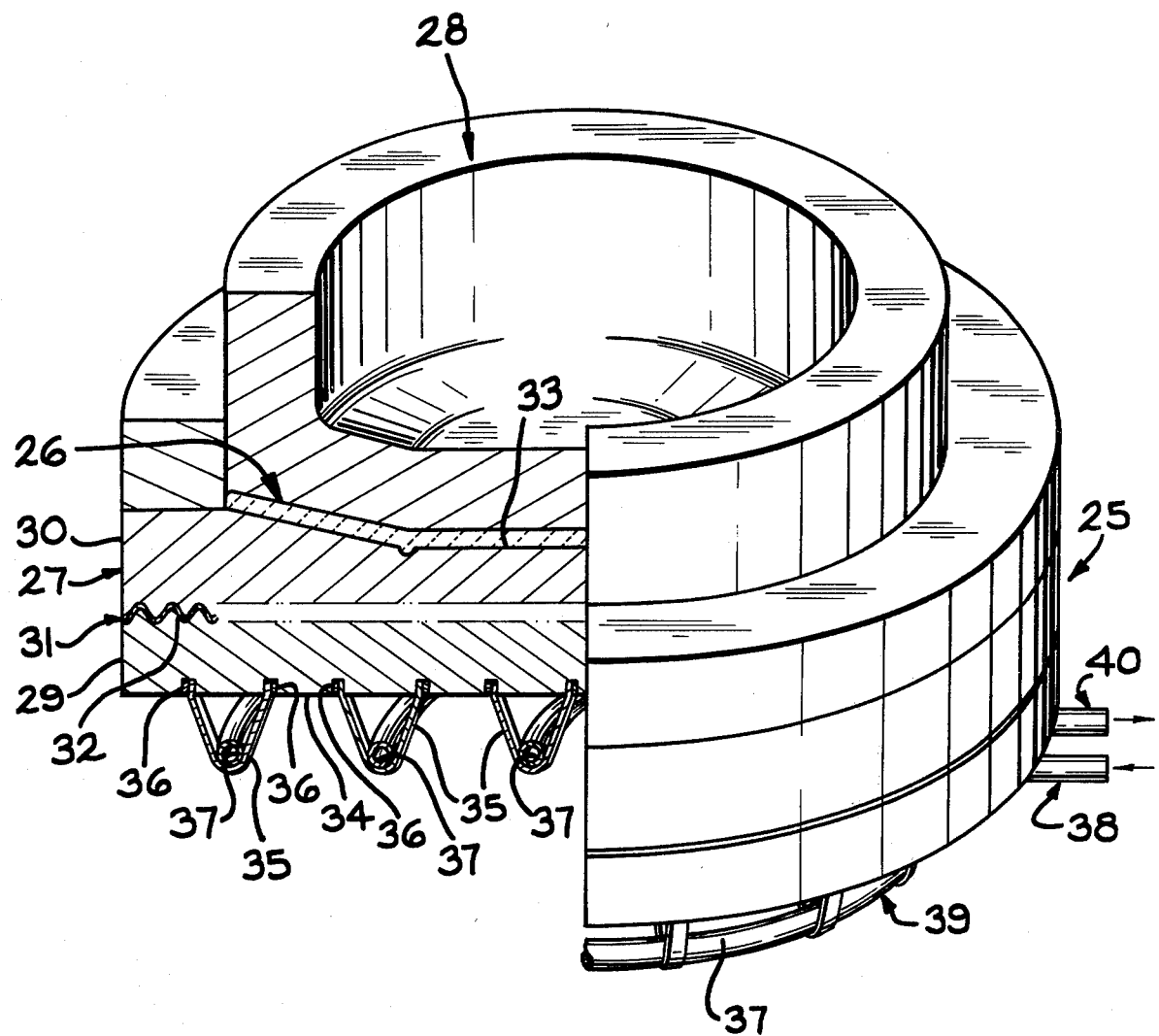
FIG. 2 is a partially-schematic, partially-sectioned, perspective view illustrating a further embodiment of the improvement of the invention, and showing a mold which can be used for press-forming a glass article.

Another mold and plunger assembly according to the present invention is indicated generally at 25 in FIG. 2. The assembly 25 is shown in a closed position with a glass article 26 positioned therein between mold part 27 and a plunger 28. The mold part 27 is made up of two members, a lower part 29 and an upper part 30; the two meet in a non-planar region 31 in which malleable, annealed aluminum foil 32 is disposed. The lower member 29 and the upper member 30 are held together tightly by threaded members (not illustrated), so that there is good contact, in the region 31, between the non-planar surfaces of the members 29 and 30 and the aluminum foil 32 disposed therebetween. In the mold and plunger assembly 25, this arrangement facilitates heat transfer from a forming surface 33 thereof through the upper part 30, through the aluminum foil 32 and through the lower part 29 to a heat dissipating surface 34 thereof. Heat conducting elements 35 are locked to the lower member 29 adjacent the heat dissipating surface 34 by wedges 36, and are brazed to conduits 37.

In operation, the plunger 28 is raised from the position shown in FIG. 2, the glass article 26 is removed from the mold 25, a gob of molten glass is placed on the forming surface 33 of the mold part 27, and the plunger 28 is lowered to the position shown in FIG. 2. Heat introduced by the glass gob is transferred, as previously described, to the heat dissipating surface 34 and then through the heat conducting elements 35 and the conduits 37 to water circulated therethrough. The water which is circulated through the conduits 37 enters through an inlet 38, flows through a supply header 39, the conduits 37, a return header (not illustrated) and leaves the apparatus through an outlet 40.

The heat conducting elements 35 are sized, from measurements and calculations as previously discussed in connection with the mold 10 of FIG. 1, to maintain the forming surface 33 at an optimum temperature. The wedges 36 are composed of a material having a coefficient of thermal expansion substantially the same as that of the portion of the heat dissipating surface 34 at which they hold the heat conducting elements 35 in releasable high pressure engagement, so that heat transfer therethrough occurs essentially unimpeded and the elements 35 remain solidly engaged, irrespective of variations in the heat flow rate or temperature at the surface 34. The heat conducting elements 35 are composed of iron, coated with nickel to improve their resistance to oxidation and corrosion. The elements 35 are brazed to the conduits 37. Alternatively, the elements 35 can be clamped tightly to the conduits 37 so that they are releasably engaged therewith. It is desirable to avoid significant temperature drops between the elements 35 and the conduits 37 and between the elements 35 and the lower part 29.

It will be appreciated that, in a mold such as the one described above in reference to FIG. 2, the material of high thermal conductivity between the mold parts at their interface can be any suitable powder, liquid, or solid. If a solid material is used, however, it should be malleable so that, when parts such as the lower and upper members 29 and 30 of the mold part 27 are assembled together, the solid is compressed into conformity to the shape of the interface between the parts, whether the interface is a planar region or a non-planar region. For the foregoing reason, metal foils composed of ductile metals such as annealed aluminum or annealed copper are preferred. If a powder is used, it should be one which is oxidation resistant; for example, graphite, stainless steel, nickel and chromium, or metals such as Mo, W, Ag and Au are all suitable.

Suitable malleable solids can also be combined with a suitable oxidation-resistant powder, selected, for example, from those listed above, and the combination placed between the surfaces of the mold parts at their interface. This procedure can advantageously assist in filling any voids in the interface, which may result, for example, due to slight nonconformity of the solid to the shape of the surfaces as they are joined together. Powdered graphite is particularly desirable for use in this regard because it effectively assists the flow of solids, especially when a metal is used.

It will be apparent that various changes and modifications can be made from the details of construction shown in the attached drawings and discussed in conjunction therewith without departing from the spirit and scope of the instant invention as defined in the appended claims. It is, therefore, to be understood that this invention is not to be limited to the specific details shown and described.

What I claim is:

1. In a mold having a heat dissipating surface and a forming surface in heat transfer communication with the heat dissipating surface, the improvement of a conduit exterior of and spaced from the mold and a plurality of heat conducting elements mounted spaced from one-another along the length of the conduit, and extending to the surface of the mold each of which is in heat transfer communication with said conduit and with a portion of the heat dissipating surface, each of said elements being of such size, shape and material, and being so situated with respect to heat transfer from the heat dissipating surface that, when the mold is in service and a heat transfer fluid is circulated through said conduit, heat transfer from the heat dissipating surface, through said heat conducting elements and to the conduit maintains each segment of the forming surface at a predetermined temperature.

2. The improvement claimed in claim 1 wherein the mold has two parts, one of which includes the heat dissipating surface and the other of which includes the forming surface, and the two parts have a heat conducting interface through which heat is transferred from the forming surface to the heat dissipating surface.

3. The improvement claimed in claims 1 or 2 wherein the heat conducting elements are held in heat transfer communication with the conduit by a material of high and stable thermal conductivity, and wherein the heat transfer communication is such that there is no significant temperature difference in service between the heat conducting elements and the conduit.

4. The improvement claimed in claims 1 or 2 wherein the heat conducting elements are held in heat transfer communication with a portion of the heat dissipating surface by a material of high and stable thermal conductivity, and wherein the heat transfer communication between the heat conducting elements and the heat dissipating surface is such that there is no significant temperature difference between the two.

5. The improvement claimed in claims 1 or 2 wherein the heat conducting elements are composed of a material which is resistant to oxidation and corrosion.

6. The improvement claimed in claim 5 wherein the material is a metal coated with a substance which offers protection to the metal from oxidation and corrosion.

7. The improvement claimed in claim 3 wherein the material holding the heat conducting elements in heat transfer communication with the conduit has a coefficient of thermal expansion substantially the same as that of said conduit and is releasably engaged therewith.

8. The improvement claimed in claim 4 wherein the material holding the heat conducting elements in heat transfer communication with a portion of the heat dissipating surface has a coefficient of thermal expansion substantially the same as that of said portion and is releasably engaged therewith.

9. The improvement claimed in claim 2 wherein there is a material of high thermal conductivity between the surfaces of the mold parts at their interface.

10. The improvement claimed in claim 9 wherein said material is a malleable solid so that, when the joined surfaces are assembled together, said solid is compressed into conformity to the shape of the interface.

11. The improvement claimed in claim 10 wherein said material is a metal foil.

12. The improvement claimed in claim 11 wherein the foil is a ductile metal such as annealed aluminum or annealed copper.

13. The improvement claimed in claim 9 wherein said material is an oxidation-resistant powder such as graphite, stainless steel, nickel, chromium or a metal selected from the group consisting of Mo, W, Ag and Au.

14. The improvement claimed in claim 10 wherein there is, additionally, an oxidation-resistant powder such as graphite, stainless steel, nickel, chromium or a metal selected from the group consisting of Mo, W, Ag and Au between the surfaces of the mold parts.

* * * * *